United States Patent
Beckmöller et al.

(10) Patent No.: US 7,609,627 B2
(45) Date of Patent: Oct. 27, 2009

(54) METHOD FOR PACKET DATA TRANSMISSION

(76) Inventors: Carola Beckmöller, Königsberger Str. 49, 47495 Rheinberg (DE); Ralf Kern, Holtwicker Str. 62A, 46399 Bocholt (DE); Jürgen Schüling, Am Sandbach 18, 46397 Bocholt (DE)

( * ) Notice: Subject to any disclaimer, the term of this patent is extended or adjusted under 35 U.S.C. 154(b) by 696 days.

(21) Appl. No.: 10/488,065

(22) PCT Filed: Aug. 14, 2002

(86) PCT No.: PCT/DE02/02983

§ 371 (c)(1),
(2), (4) Date: Feb. 27, 2004

(87) PCT Pub. No.: WO03/028311

PCT Pub. Date: Apr. 3, 2003

(65) Prior Publication Data

US 2004/0240391 A1    Dec. 2, 2004

(30) Foreign Application Priority Data

Aug. 27, 2001  (DE) .................. 101 41 815

(51) Int. Cl.
*H04L 1/20* (2006.01)
(52) U.S. Cl. ...................... 370/230; 370/236
(58) Field of Classification Search ......... 370/229–230, 370/236, 395.4, 395.42
See application file for complete search history.

(56) References Cited

U.S. PATENT DOCUMENTS 6,167,031 A * 12/2000 Olofsson et al. ............ 370/252
6,262,994 B1 * 7/2001 Dirschedl et al. ........... 370/465
6,308,082 B1 * 10/2001 Kronestedt et al. ....... 455/67.11
7,095,719 B1 * 8/2006 Wilhelmsson et al. ...... 370/252
2001/0002912 A1 * 6/2001 Tony et al. ................. 370/487
2002/0123351 A1 * 9/2002 Miyoshi et al. ............. 455/452
2002/0151275 A1 * 10/2002 Trost et al. .................. 455/41
2002/0155808 A1 * 10/2002 Kawamura ................ 455/3.05
2003/0002518 A1 * 1/2003 Shibutani ................... 370/442

FOREIGN PATENT DOCUMENTS

| DE | 196 05 223 | 9/1997 |
| DE | 197 28 469 | 1/1999 |
| EP | 1 089 502 | 4/2001 |
| EP | 1089502 A2 * | 4/2001 |
| EP | 1 109 343 | 6/2001 |
| EP | 1109343 A2 * | 6/2001 |
| WO | WO 00/41431 | 7/2000 |

OTHER PUBLICATIONS

Sugiyama N.; "Core Technologies of Bluetooth Systems" OKI Technical Review 184, Review 184, vol. 67, Dec. 2000 pp. 28-31.

* cited by examiner

*Primary Examiner*—Kwang B Yao
*Assistant Examiner*—Andrew Lai
(74) *Attorney, Agent, or Firm*—Baker Botts L.L.P.

(57) ABSTRACT

A method for packet data transmission in a communication system is disclosed, where the packet data includes a first type of data packet and at least one alternative second type of data packet. According to the method, quality modifications of a transmission channel used as a connection between a data source and data sinks are detected and, according to the detected quality modification, a data packet type of a successive data packet to be transmitted via the transmission channel is selected.

10 Claims, 1 Drawing Sheet

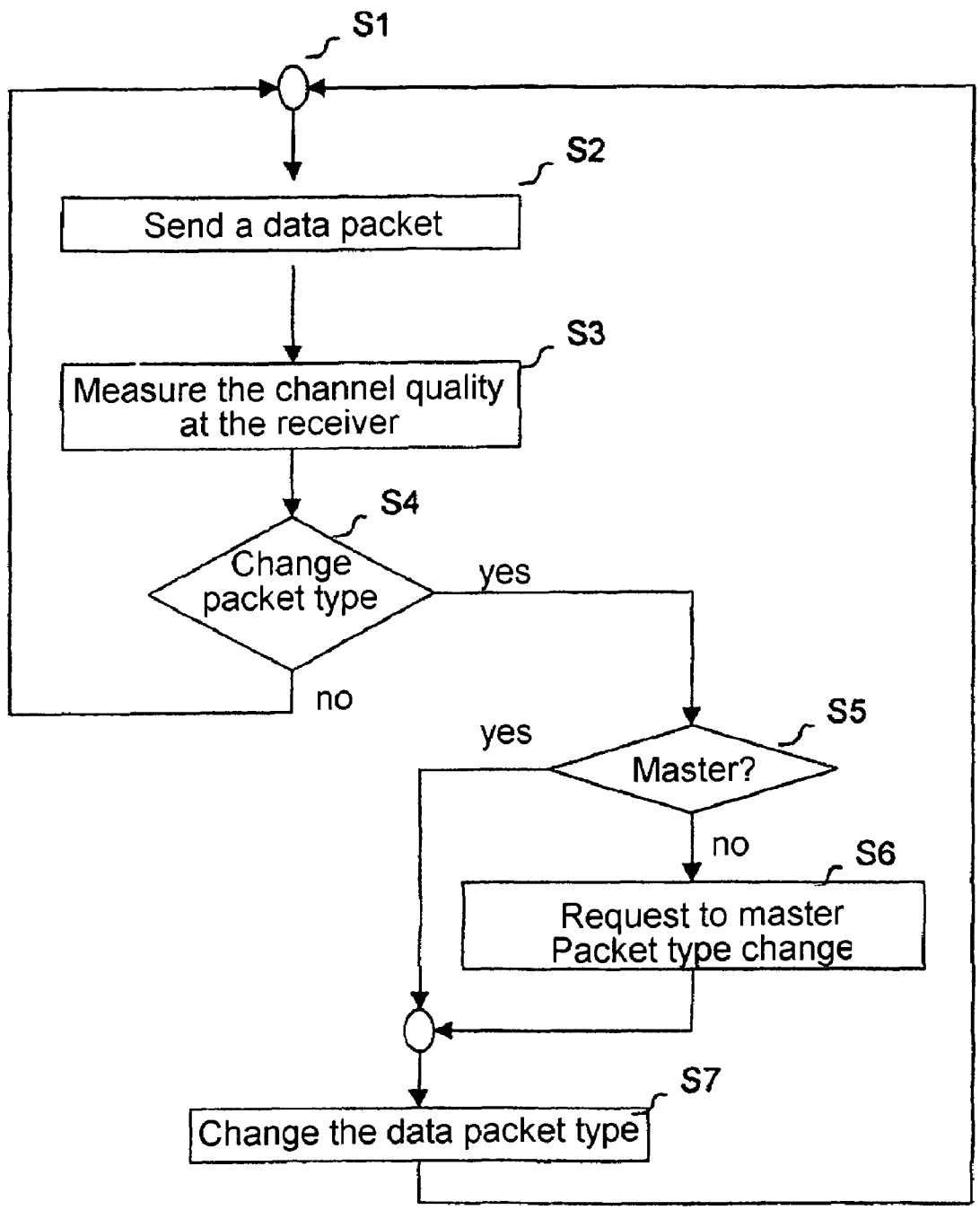
FIG

METHOD FOR PACKET DATA TRANSMISSION

The invention relates to a method for packet data transmission

BACKGROUND

Generally, in information and telecommunications technology the segmenting and successive transmission payload data to be transmitted is known. Furthermore it is generally known that as payload data or payload information control information is appended to these data segments, generally referred to as data packet, for example addressing data, transmission sequence, flow control and error correction, so that the data packets can be assigned to the correct recipient and so that after transmission is completed, any necessary error handling can be performed on the receive side and the data packets—data segments—can be reassembled correctly again.

When a data packet of this type passes through a number of layers which in their turn are assigned protocols, especially error protocols, before being transmitted over a physical channel—for which provision is made in accordance with the OSI reference model for example—, the payload data of a data packet will mostly be encapsulated within a number of items of control information assigned to the individual layers or protocols, with data for error correction in each case.

The control information appended to the payload data in this way results in it occupying the capacity of the transmission channel/channels and thus reducing the payload data rate or the payload data throughput.

SUMMARY

Under the present disclosure, the throughput of payload data may be increased.

Under the method for packet data transmission in accordance with the present disclosure, with a first data packet type and at least one alternate second data packet type, changes in quality of a transmission channel used for a connection between a data source and a data sink From EP 1 089 502 A2 a radio communications system as well as a method is known in which parameters for the transmission of audio and video data are selected depending on the characteristics of a wireless connection for said transmission.

From EP 1 109 343 A2 an adaptive method for operating a channel coder is known which, on the basis of characteristics of a current wireless connection, controls the channel coder in such a way that it switches between different forms of channel coding.

From U.S. Pat. No. 6,262,924 B1 an arrangement for optimizing a bidirectional radio data transmission is known in which a transmission device can select different types of modulation.

However, using the disclosed methods, the throughput of payload data may be increased over the prior art.

With the method for packet data transmission in accordance with the invention, with a first data packet type and at least one alternate second data packet type, changes in quality of a transmission channel used for a connection between a data source and a data sink are recorded and, depending on the change in quality recorded, a packet type of a following data packet to be transmitted over the channel will be selected.

The inventive method can be advantageously implemented in a radio communications system.

Selecting a second data packet type which features a lower proportion of control data than the first data packet type in the case where the transmission channel is of good quality results in more effective use of the transmission channel.

A development of this is to select a data packet type which features a smaller number of error coding bits. The advantage of this development is that the redundant data provided for error coding can be saved, so that the control data part of a packet can be reduced without leaving out information.

A simple implementation is achieved if a good quality is signaled on reaching a first threshold value by a variable reflecting the quality of the transmission channel small.

The advantage of recording the change in quality on the data sink side is that changes in quality that cannot be recorded by the data source can be detected by the data sink, in particular an error rate determined there, and transmitted to the data source, so as to largely ensure that it is possible to react to all faults on the transmission channel.

Under an exemplary embodiment, to determine the change in quality, a number of packet retries are recorded and/or a field strength measurement of received signals is taken reflecting the quality of the transmission channel.

Implementing the method in a radio telecommunications system which functions in accordance with the Bluetooth Standard has the advantage of simple implementation, since according to the Bluetooth Standard different data packet types, for example DM5, DH5 or AUX1, are provided, which differ especially in the number of bits provided for an error correction.

Advantageous combinations of data packets are produced when a) the first data packet type is embodied as per Bluetooth as a DM5 packet, b) the second data packet type is embodied as per Bluetooth as a DH5 packet.

or a) the first data packet type is embodied as per Bluetooth as a DM5 packet, b) the second data packet type is embodied as per Bluetooth as an AUX1 packet, in which case any given further combination of data packet types suggested for Bluetooth is conceivable, provided they achieve the desired effect—more effective use of the transmission channel to increase the data rate.

BRIEF DESCRIPTION OF THE DRAWINGS

The disclosure contained herein will be more readily understood by reference to the following detailed description taken in conjunction with the accompanying drawings, wherein:

FIG. 1 illustrates an exemplary flowchart of an adaptive data packet type selection in a radio telecommunications system functioning in accordance with the Bluetooth short-range standard for optimizing the data throughput when there are qualitative changes to the transmission channel.

DETAILED DESCRIPTION

Turning to FIG. 1, in a first step S1 the exemplary method is in its initial state. In this state the procedure is running, under the control of a microprocessor of a terminal carrying a Bluetooth radio module for example, especially as an interrupt-controlled background process.

An interrupt would be a file transmission requested by the terminal for example. If this occurs, a first packet, generally the first of a number of packets, is sent in a second step S2.

For this the data packet is initially constructed in accordance with a first present data packet type, which with Bluetooth systems will generally be a DM5 packet.

The DM5 packet features a payload data area of 226 bytes, in which case this area also contains error coding (Forward Error Correction, FEC) with an additional 16-bit CRC for the payload data area, so that the transmission of this type of packet uses up to five time slots.

Subsequently, in a third step S3, the channel quality of a channel used for this packet data transmission is recorded.

The number of packet retries, which can be evaluated by the sender itself, can serve as a measure for determining the channel quality here.

This measure can however be combined with other metrics or even replaced by other metrics which can be included for estimating channel quality, in which case metrics can also be used which allow evaluation on the receiver side For example this can be done in such a way that a receiver—a further terminal equipped with a Bluetooth radio module—of the data packet evaluates the error rate of the received data packet (Cyclical Redundancy Check, CRC error) or the receive field strength of a signal transferring the data packet (Received Signal Strength Indication, RSSI), so that in a fourth step S4 a check can be made on whether the data packet type currently being used is required.

The check carried out in the fourth step S4 is undertaken in such a way that when the channel quality reaches a first threshold value, for example when the number of packet retries has dropped below a particular value, which could also be signaled to the sender—after introduction of the corresponding signaling process in the standard—by the receiver, the decision is taken in the sender to select a suitable data packet type.

For a system functioning in accordance with the Bluetooth Standard this will generally involve the DH5 packet type.

The DH5 packet has a similar structure to the DM5 packet but differs in that it features a payload data area of 341 bytes in length, with the major difference being that with DH no error coding is contained in the payload data area, but exactly like the DM5 there is an additional 16-bit CRC and transmission is also in up to five time slots.

By Checking whether a currently used packet type matches the current characteristics of the transmission channel it is possible to ensure at if there is a change to the quality of the transmission channel a maximum possible net or user data rate is guaranteed.

When the quality of the transmission channel drops again, which is noticeable by a falling of the net or user data rate, since the number of bit errors increases the first data packet type is selected the next time that step S4 is executed.

An extension or alternative to the third step S3 and the fourth step S4 is produced by defining a first data packet type as the default, so that to identify an improvement in the channel characteristics, the second data packet type is defined at regular intervals so that a higher net or user data rate is produced Alternatively in the fourth step S4 a second threshold value can also be used as the lower limit for the channel quality which is reached when for example the number of recorded packet retries exceeds a particular value, so that on reaching this second threshold value the first data packet type is chosen.

On the basis of the exemplary embodiment for a telecommunications device functioning in accordance with Bluetooth, this means that initially in the fourth step S4 a switch is made from $\frac{2}{3}$ FEC coded first data packet type DM5 to the uncoded second data packet type DH5. When in a subsequent run the quality of the transmission channel drops again, the net or user data rate falls because the bit error rate increases.

This leads to an increase in number of packet retries which serve in step S4 as a measure for determining the quality of the transmission channel.

If the number of packet retries exceeds a specific defined value, the quality falls below the second threshold value so that the sender in this case selects the more suitable first data packet type DM5

A switch back to the second data packet type DH5 can take place if the value drops below a lower limit for the number of packet retries on sending DM5 packets, i.e. if it reaches the first threshold value.

As an alternative to this there can be a switch at regular intervals to transmitting data packets in accordance with the second data packet type and then after a further execution of the first step S1 and second step S2, in a third step S3 to establish whether the channel characteristics have improved by checking whether the number of package retries has increased, if it has not the second data packet type is retained in the fourth step S4, otherwise the first data packet type is selected again.

If a change of data packet type is determined in the fourth step S4, it must be established in a fifth step whether the data source involved is the master or the slave of a telecommunications network. This check is required in systems with a hierarchical structure in which a superordinate communications device prespecifies technical parameters for the connection. Such a hierarchical structure is especially specified in systems functioning in accordance with Bluetooth by the master-slave architecture in such systems.

If the interrogation in the fifth step reveals that this device is the master, the switch-over to another data packet type can be undertaken immediately in the following seventh step and the procedure can switch to the initial state in first step S1. If the device is the slave, this must first send a request to the master in a sixth step S6 so that the seventh step S7 can be performed.

The execution sequence of the procedure described in accordance with the invention should not just be restricted to Bluetooth systems that can be used for data applications for which a highest possible data rate, even under difficult conditions such as for example at the limit of coverage or with interference from other transmitters (e.g. microwave), is required.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for packet data transmission in a Bluetooth radio communication system, wherein the packet data comprises a first data packet type and at least one different second data packet type, comprising the steps of:

recording changes in a quality of a transmission channel used for a connection between a first data source and a data sink;

depending on the changes in the quality recorded, switching back and forth between the first data packet type and the at least one different second data packet type for subsequent data packets to be sent over the transmission channel, wherein
  a) the first data packet type is a DM5 packet, and
  b) the at least one different second data packet type is a DH5 packet, and
wherein the step of switching back and forth between the first data packet type and the at least one different second data packet type comprises determining if the first data source is a master data source or a slave data source, and if the first data source is the master, then the switch to another data packet type is made immediately, and if the first data source is the slave, then the switch to another data packet type is made after requesting to a master of the slave the data packet type switch.

2. The method according to claim 1, wherein based at least the recorded changes, transmitting the second data packet type, wherein the second data packet type features a lower proportion of control data than the first data packet type.

3. The method according to claim 2, wherein the second data packet type features a lower number of error coding bits compared to the first data packet type.

4. The method according to claim 2, wherein the good quality is signaled upon reaching a first threshold value of a variable reflecting the quality of the transmission channel.

5. The method according to claim 2, wherein, for a transmission channel with a bad quality, the first data packet type is selected, the bad quality being signaled when a second threshold value is reached.

6. The method according to claim 1, wherein the change in quality is recorded on the data source side.

7. The method according to claim 1, wherein
  a) the change in quality is recorded on the data sink side, and
  b) a message specifying the change in quality is transmitted from a data sink to the data source.

8. The method according to claim 1, wherein, to determine the change in quality, one of (a) a number of packet retries are recorded, and (b) a field strength measurement of received signals is taken, reflecting the quality of the transmission channel.

9. A method for packet data transmission in a Bluetooth radio communication system, wherein the packet data comprises a DM5 data packet type and at least one DH5 data packet type, the method comprising the steps of:
  recording changes in a quality of a transmission channel used for a connection between a first data source and a data sink, wherein the changes in quality are defined by a first threshold and a second threshold;
  selecting a subsequent data packet type to be a DM5 data packet type if the change in the quality reaches the first threshold;
  selecting a subsequent data packet type to be a DH5 data packet type if the change in the quality reaches the second threshold; and
  switching back and forth between the DM5 data packet type and the at least one DH5 data packet type based on the changes in the quality of the transmission channel, wherein the step of switching back and forth between the DM5 packet type and the at least one DH5 data packet type comprises determining if the first data source is a master data source or a slave data source, and if the first data source is the master, then the switch to another data packet type is made immediately, and if the first data source is the slave, then the switch to another data packet type is made after requesting to a master of the slave the data packet type switch.

10. The method according to claim 9, wherein the first threshold indicates a better quality, compared to the second threshold.

* * * * *